United States Patent Office 2,742,352
Patented Apr. 17, 1956

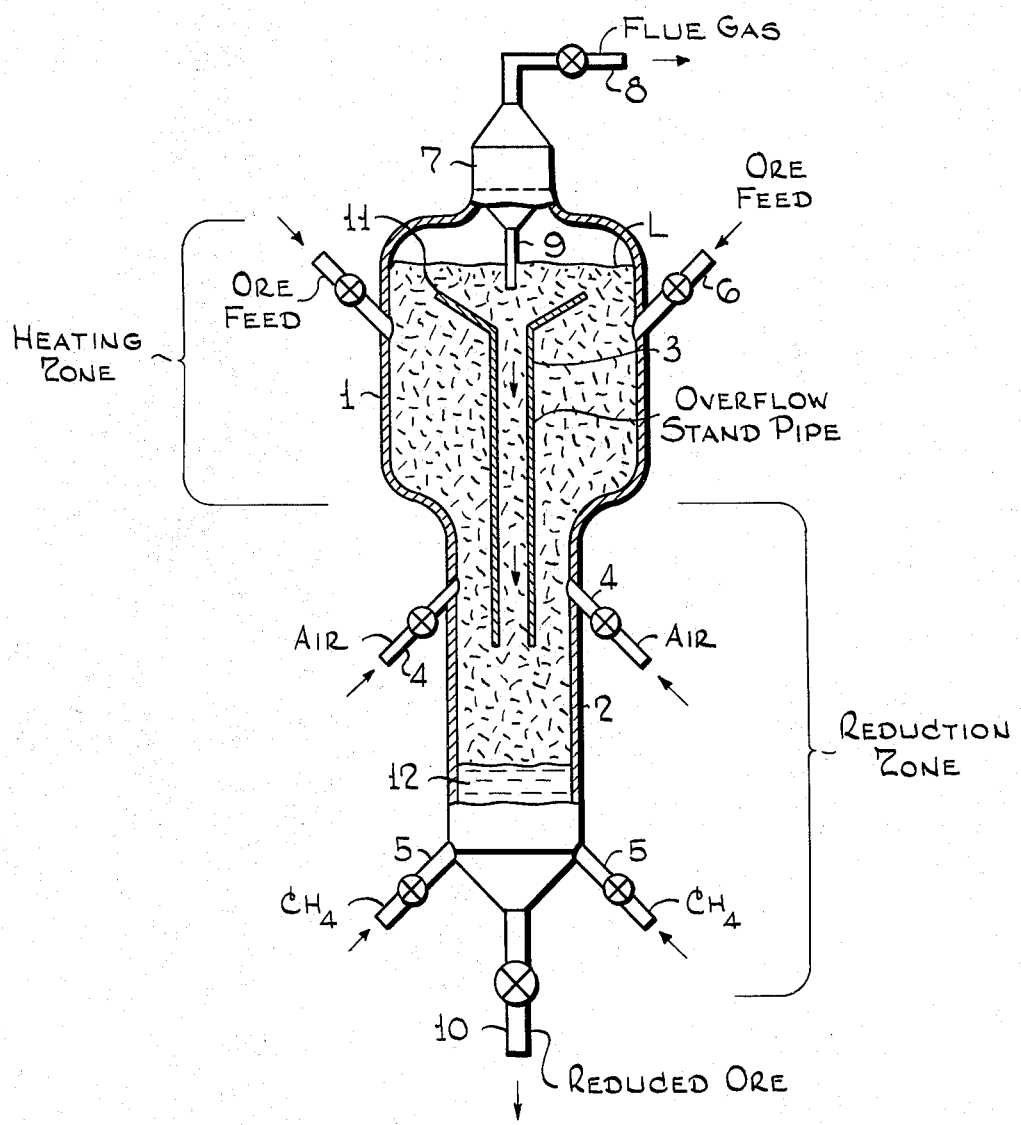

2,742,352
ORE REDUCTION PROCESS

Edwin R. Gilliland, Arlington, Mass., assignor to Esso Research and Engineering Company, a corporation of Delaware Application March 5, 1952, Serial No. 274,874

5 Claims. (Cl. 75—26)

The present invention relates to an improved ore reduction process. More specifically the invention is concerned with the production of metals of the iron type such as iron, nickel, etc. from their oxides. The invention is particularly adaptable to the reduction of oxidic ores of these metals by reduction with gaseous hydrocarbons such as methane, ethane, natural gas, refinery gases or the like.

Heretofore many efforts have been made to utilize gaseous hydrocarbons, particularly natural gas, as a reducing agent for the recovery of metals from their oxidic ores, for example, recovery of iron from iron oxide ores. Natural gas is an abundant and inexpensive raw material. However, its direct use as a reducing agent for metallic ores such as oxidic ores have encountered serious difficulties which make processes of this type unattractive in commercial operation.

Probably the most important single reason for this situation must be found in the particularly poor thermal characteristics of ordinary hydrocarbons as the reducing agent for oxidic iron ore or the like. The prevailing reduction reactions involving such hydrocarbons are strongly endothermic and their rates become appreciable only at relatively high temperatures. In order to supply the heat required by these reactions and to maintain temperatures of this high level in the reduction zone, by preheating either the gas feed or the ore or both, prohibitively high preheating temperatures are required. If this heat is to be supplied from an external source through the walls of the reduction zone, temperature and the temperature gradients are undesirably high, making it difficult to supply heat in this manner. If it is attempted to generate the heat within the reduction zone itself by a combustion of fuels, the reactions must be carefully controlled so that the ratio of $CO_2:CO$ in the gas phase stays below the equilibrium value, at the temperature employed, of the oxidation, reduction reactions of iron oxides in the presence of carbon oxides. When employing the ore in powdered form particularly when using the so-called fluid solids technique, high temperatures above about 950° C. in the reduction zone must be avoided because such high temperatures have been found to be conducive to agglomeration of particles, probably as a result of plasticization of the solids, particularly the reduced iron itself. It follows that the process requires the supply of a large amount of heat and simultaneously a careful control of temperature within relatively narrow limits.

It has been suggested to supply the heat required in the reduction zone by the combustion of substantially pure hydrogen in contact with the ore. However, pure hydrogen is expensive and its high cost effects adversely the economics of this type of operation. When attempting to generate sufficient heat by a partial combustion of methane in contact with the ore and/or reduced metal, other considerable difficulties arise. In the first place the oxidation of methane merely to CO has only a rather insignificant positive heat effect so that when substantial amounts of heat are required the methane consumption is excessive. Far more heat may be produced by burning methane all the way to $CO_2$ and $H_2O$. However, as shown above, only a limited $CO_2$ concentration may be tolerated in the reduction zone, if reoxidation of metal is to be avoided. It is extremely difficult, therefore, to reconcile the requirements of efficient heat generation and reduction when using methane both as the reducing and combustion-supporting agent.

The present invention is chiefly concerned with a practical method for proper utilization of hydrocarbon gases in an ore reduction process.

It is, therefore, the principal object of the present invention to provide an improved process for reducing metal oxides of the iron type with hydrocarbon gases.

A more specific object of the invention is to provide a practical and economic method for the direct reduction of solid metal oxides of the iron type with hydrocarbon gases such as methane, natural gas or its equivalents. Other objects and advantages of the invention will appear from the following detailed description read with reference to the accompanying drawing.

In accordance with the present invention these objects are accomplished by burning a hydrocarbon gas with air in a heating zone in the presence of finely divided iron ore (substantially $Fe_2O_3$) maintained in a dense suspension by means of upflowing gases and their combustion products. Combustion of the hydrocarbon gas is carried out to an extent that the finely divided ore is partially reduced to an intermediate oxide and heated to a temperature above that necessary to obtain practical rates of reduction to metal in a second zone by a gas introduced thereto originally as a hydrocarbon, e. g. methane. However, the combustion is controlled so that the gases are substantially non-oxidizing with respect to the intermediate oxide of reduced oxygen content, for example, FeO. About 1½ to 2 mols of hydrocarbon (on a methane basis) are employed per mol of $Fe_2O_3$ fed to the combustion zone.

The heated partially reduced oxide is transferred by means of an overflow standpipe from the heating zone to a lower reduction zone where it is then contacted in a dense phase suspension with undiluted hydrocarbon gas, e. g. methane, introduced at the bottom of the zone. In the reduction zone, a portion of the intermediate oxide is reduced to metal and the formation of some carbon occurs due to cracking of the hydrocarbon entering the zone. This carbon is ultimately recovered either in the metal produced, or else it finds its way into the gasification zone, between the reduction zone and the heating zone. Carbon in the product is desirable, for example, in the production of pig iron, since a few percent of carbon lowers the melting point of the iron several hundred degrees. If carbon is present and is considered undesirable, the bottoms product from the reduction zone should contain a small amount of unreduced oxide mixed with the metal, such that on subsequent soaking of the hot withdrawn product the oxide would just consume the amount of contained carbon. The reduction zone functions as a buoyancy separator to separate metal from the partially reduced intermediate oxide with the result that the oxide forms an upper lighter phase and is carried back into the heating zone 1 with the aid of the high velocity air or other combustion-supporting gas entering the base of the heating zone via line 4. In order to supply the required heat to the reduction zone it is necessary to circulate thereto from the heating zone approximately 10 to 20 volumes of intermediate oxide for each volume of oxide reduced to metal in the reduction zone.

The ore in the heating zone is brought up to a temperature in the neighborhood of about 1000° C.–1200° C. in the case of $Fe_2O_3$. At temperatures in this region, of course, care should be exercised to maintain the combustion gases substantially non-oxidizing in nature, so that no appreciable reoxidation of the partially reduced oxide occurs. Temperatures in the reduction zone are maintained preferably in the range of 750°–900° C. for the reduction of $Fe_2O_3$.

The nature of the present invention will be more readily apparent from the following description when read in connection with the drawing which is a semi-diagrammatical illustration of the apparatus suitable for the practice of the invention.

Referring to the drawing the apparatus consists essentially of a heating and partial reduction zone 1 equipped with air ports 4 and ore feed lines 6, gas removal means 8 and solid removal means in the form of an overflow standpipe 3. Beneath the heating zone is a reduction zone 2 communicating with the heating zone. The reduction zone contains gas ports 5 for the introduction of undiluted hydrocarbon gases, that is, gases containing no appreciable amounts of combustion-supporting gases such as air or oxygen. Reduced ore product (metal) is removed from the bottom of the reduction zone via withdrawal line 10. Zone 1 preferably has a larger horizontal cross sectional area than zone 2 due to the necessity for handling the larger volume of gas in the form of hydrocarbon, air and combustion products in zone 1.

In the operation of the apparatus of the drawing finely-divided iron ore containing iron in a high state of oxidation and having a fluidizable particle size distribution between 50 microns and 20 mesh is supplied to zone 1 via lines 6. In this zone the ore is preheated and partially reduced by hot combustion gases, as will appear more clearly hereinafter, to a temperature as high as about 1200° C. in the case of $Fe_2O_3$. In zone 1 the finely divided solid is kept in a highly agitated dense suspension by proper maintenance of velocities of gases entering the zone 1 via lines 4 and from zone 2. The solid is maintained at a level L above well 11 of standpipe 3 such that the hot solid overflows into the standpipe and is allowed to descend therein to reduction zone 2. In reduction zone 2 the hot solid contacts hydrocarbon gas, such as methane or natural gas, entering the bottom thereof via line 5. In zone 2 the solids are maintained in the form of a dense turbulent suspension by means of hydrocarbon gases entering through line 5 and oxidation products of such gases once reaction of these gases with the hot oxide occurs. The hydrocarbon gas entering line 5 is undiluted, that is, contains substantially no air, oxygen, or other gases oxidizing with respect to iron metal. In zone 2 the solid is converted by the upwardly flowing hydrocarbon gas (and its reaction products with the hot oxide, e. g. CO and $H_2$) into a dense, turbulent, fluidized suspension. For this purpose the dimensions of the reduction chamber are so chosen that substantial reduction of iron ore to metal during the residence time of the ore in the chamber is obtained at linear gas velocities within the chamber of 0.5 to 3.0, preferably about 0.7 to 1.5 ft. per second, to establish apparent phase densities within the chamber of 25 to 100 lbs. per cubic foot. Lower phase densities may be applied. However, the solids should amount to at least 5% and preferably more than 10% by volume of the dense phase.

In the reduction zone approximately 10 to 20 volume percent of the circulating iron oxide is reduced to metallic iron which separates out of the fluid bed due to change in density. This separated iron collects in a pool 12 at the bottom of zone 2. Metal is drained off from zone 2 via pipe 10 which is equipped with a ceramic plug type valve.

Gases emerging from reduction zone 2 pass upwardly into zone 1. In zone 1 combustion of these gases, $CH_4$, CO and $H_2$, occurs with the air introduced thereto via line 4 and the exothermic reactions occurring impart heat to the fluidized solids contained in the heating zone as previously related. Combustion gases are removed from the heating zone via cyclone 7 and exit pipe 8. Entrained solids are removed in the cyclone system and returned to zone 1 via dipleg 9. Heat is recovered from the flue gases in exit pipe 8 by conventional means.

All the hydrocarbon gas supplied to the system is introduced thereto via lines 5. However, it may sometimes be desirable to introduce a portion of such gas directly to zone 1 since this reduces the amount of heat required to be carried from zone 1 to zone 2. It is understood, however, that the amount of hydrocarbon gas admitted to the reduction zone 2 cannot be reduced below that required for reduction of the oxide to metal.

The hydrocarbon gas employed in the reduction zone is preferably preheated to a temperature below its cracking temperature, say about 300 to 500° C. Its amount is so controlled that sufficient hydrocarbon is present for the reduction of the iron oxide and for supplying the necessary heat for reduction in zone 2. Compressed air entering through line 4 is preferably preheated to a temperature of about 600°–900° C. preferably in heat exchange with hot combustion gases removed from the system via line 8. The total amount of air fed through line 4 is so controlled that just enough oxygen is made available in the heating zone to maintain therein in cooperation with any oxygen of the solid an average temperature above the temperature of zone 2 but not in appreciable excess of 1200° C. About 2 to 4 normal cu. ft. of air per cu. ft. of methane supplied to reduction chamber 2 is sufficient for good operating conditions. It should be borne in mind that the amount of air should be such and introduced at such a rate that will leave the gas in zone 1 still non-oxidizing in character to FeO. Thus, in a satisfactory operation, the ratio of $CO_2$+water vapor/CO+$H_2$ in the gases leaving zone 1 will be greater than 2:1. It is a known fact that the air introduced through line 4 will rise vertically with almost no back downward flow. The combustion of this air with the hydrocarbon and its reaction product emerging from zone 2 and entering the bottom of zone 1 generates all the heat necessary for the endothermic reduction reaction occurring in zone 2. The downflow of the hot solids via standpipe 3 serves to transport that heat to reduction zone 2, the hot oxide entering the reduction zone at a point below the point of air admission to zone 1. It is in the reduction zone that substantially all the actual reduction of the oxide to metal takes place. As previously explained, the heating vessel has a top horizontal cross section which is large relative to the cross section of vessel 2 because in the top one must provide for the large extra volume of gas brought in as air.

Reduced iron ore in the form of sponge iron and containing controlled amounts of carbon is withdrawn through draw-off line 10 and passed to a melting furnace suitable to the processing of powdered sponge iron of the type here involved.

Having described the invention in a manner such that it may be practiced by those skilled in the art, what is claimed is:

1. Process for reducing metal oxides of the iron type, said oxides existing in the form of a higher oxide and a lower oxide, which comprises supplying finely divided higher metal oxide to a first heating and partial reduction zone, supplying a gaseous hydrocarbon-containing fuel mixed with lower metal oxide from a second reduction zone to said first heating zone, admixing combustion-supporting gas with said gaseous fuel as it is passed from said second reduction zone to said first heating zone, maintaining the metal oxides in fluidized state in said first heating zone, burning the fuel with the combustion-supporting gas in the presence of the metal oxides whereby the higher metal oxide is reduced to a lower metal oxide and sensible heat is imparted thereto, removing fluidized hot lower metal oxide from said first heating and partial reduction zone directly to the second reduction zone, supplying to said second reduction zone gaseous hydrocarbon substantially free of combustion-supporting gas to reduce the lower oxide to metal in said second reduction zone, controlling the velocity of gases passed through said second reduction zone so that the solid contents therein are maintained in a fluidized metal oxide base and a separated metal phase, removing a stream of the metal from said second reduction zone, and returning unreduced lower metal oxide from the second reduction zone mixed with hydrocarbon-containing fuel gas from said second reduction zone to said first heating zone.

2. The process for reducing metal oxides of the iron type, said oxides existing in the form of a higher oxide and a lower oxide, which comprises supplying the finely divided metal oxide to a first heating and partial reduction zone, supplying gaeous hydrocarbon-containing fuel to said heating zone, admixing combustion-supporting gas with said gaseous fuel as it is passed into said heating zone, maintaining metal oxides in a fluidized state in said heating zone and partial reduction zone, burning the gaseous fuel with the admixed combustion-supporting gas to reduce the higher oxide to the lower oxide and impart sensible heat thereto, removing combustion gases from said first heating and partial reduction zone, removing fluidized hot lower metal oxide from the first heating and partial reduction zone to a second reduction zone, introducing into said second reduction zone gaseous hydrocarbon, reacting a portion of the hot lower metal oxide in said second reduction zone with the gaseous hydrocarbon substantially free of combustion supporting gas whereby the lower metal oxide is reduced to metal, controlling the velocity of gases in the second reduction zone so that the solid contents thereof are maintained in a fluidized metal oxide phase and a separated metal phase, passing a resulting gaseous stream comprising an excess of the gaseous hydrocarbon, CO and $H_2$, directly from the reduction zone to said heating zone as said gaseous fuel therefor, removing a stream of said separated metal from said reduction zone, and returning unreduced lower metal oxide from the second reduction zone to said first heating zone.

3. The process defined in claim 2 in which the higher oxide is $Fe_2O_3$ which is converted to the lower oxide FeO in the first heating and partial reduction zone, the lower metal oxide is converted to metallic Fe in the second reduction zone, and in which natural gas is the gaseous hydrocarbon introduced into said reduction zone and subsequently mixed with air as said combustion-supporting gas in passing from the second reduction zone into said first heating zone.

4. The process as defined in claim 2, in which the lower metal oxide is heated to a temperature in the range of 1000° to 1200° C. in said first heating and partial reduction zone and in which a temperature of 750 to 950° C. is maintained in the second reduction zone to convert 10 to 20 volume percent of FeO as the lower metal oxide into the Fe metal in said reduction zone.

5. The process for reducing iron oxides, which comprises supplying finely divided $Fe_2O_3$ to a first heating and partial reduction zone, supplying a natural gas hydrocarbon-containing fuel to said first heating zone, introducing oxygen-containing gas and supporting combustion gases into said heating zone, maintaining iron oxides in a fluidized state in said heating and partial reduction zone, burning the fuel in said introduced oxygen-containing gas as the gases are passed up through said zone in the presence of the finely divided ferric oxide to reduce the $Fe_2O_3$ particles to FeO particles and impart sensible heat thereto, removing combustion gases overhead from said zones, removing fluidized hot FeO particles from said partial reduction zone to a second reduction zone, reacting a portion of the hot FeO in the second reduction zone with gas originally introduced thereto as a natural gas hydrocarbon and substantially free of combustion supporting gas to reduce the FeO to metallic Fe, controlling the velocity of gases passed upwardly through said second reduction zone so that solid contents thereof are maintained in a fluidized FeO phase and a separated metallic Fe phase, introducing the resulting gaseous stream comprising excess hydrocarbon, CO and $H_2$ with fluidized FeO from the upper part of said second reduction zone directly up into a bottom part of said first heating zone to supply said fuel therefor and to reheat the FeO in said heating zone, removing the stream of the metallic Fe from said second reduction zone, and returning unreduced hot FeO with the FeO formed by the $Fe_2O_3$ from said first heating and partial reduction zone as a relatively confined stream downwardly into said second reduction zone.

References Cited in the file of this patent
UNITED STATES PATENTS

| | | |
|---|---|---|
| 404,723 | McCarty | June 4, 1889 |
| 791,928 | Moore et al. | June 6, 1905 |
| 2,481,217 | Hemminger | Sept. 6, 1949 |
| 2,560,470 | Ogorzaly | July 10, 1951 |